(12) United States Patent
Delfs et al.

(10) Patent No.: US 8,738,926 B2
(45) Date of Patent: May 27, 2014

(54) DATA PROCESSING SYSTEM, METHOD FOR EXECUTING A CRYPTOGRAPHIC ALGORITHM AND METHOD FOR PREPARING EXECUTION OF A CRYPTOGRAPHIC ALGORITHM

(75) Inventors: Eckhard Delfs, Nuremberg (DE); Gerard David Jennings, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1398 days.

(21) Appl. No.: 11/972,310

(22) Filed: Jan. 10, 2008

(65) Prior Publication Data
US 2009/0183009 A1 Jul. 16, 2009

(51) Int. Cl.
G06F 12/14 (2006.01)

(52) U.S. Cl.
USPC ........... 713/189; 713/172; 713/176; 713/181; 713/193; 726/2; 726/6; 726/7; 726/26

(58) Field of Classification Search
USPC ............. 380/44; 713/187, 189, 193; 711/113, 711/158
See application file for complete search history.

(56) References Cited

U.S. PATENT DOCUMENTS

| | | | | |
|---|---|---|---|---|
| 5,915,262 | A * | 6/1999 | Bridgers et al. | 711/143 |
| 6,148,368 | A * | 11/2000 | DeKoning | 711/113 |
| 6,298,442 | B1 | 10/2001 | Kocher et al. | |
| 7,185,196 | B1 | 2/2007 | Kuskin et al. | |
| 7,234,030 | B1 * | 6/2007 | Gupta et al. | 711/154 |
| 2002/0002468 | A1 * | 1/2002 | Spagna et al. | 705/1 |
| 2004/0062391 | A1 | 4/2004 | Tsunoo | |
| 2004/0103272 | A1 * | 5/2004 | Zimmer et al. | 713/1 |
| 2004/0143748 | A1 * | 7/2004 | Yamaguchi et al. | 713/193 |
| 2004/0252831 | A1 * | 12/2004 | Uehara | 380/44 |
| 2005/0066354 | A1 * | 3/2005 | Dellow et al. | 725/30 |
| 2005/0235154 | A1 * | 10/2005 | Serret-Avila | 713/176 |
| 2006/0059285 | A1 * | 3/2006 | Fischer et al. | 710/124 |
| 2006/0080553 | A1 * | 4/2006 | Hall | 713/189 |
| 2009/0172411 | A1 * | 7/2009 | Kershaw et al. | 713/189 |
| 2009/0254761 | A1 * | 10/2009 | Thiebeauld De La Crouee et al. | 713/193 |

FOREIGN PATENT DOCUMENTS

| | | |
|---|---|---|
| EP | 1 404 052 A2 | 3/2004 |
| WO | WO-01/57677 A1 | 8/2001 |
| WO | WO-2007/130386 A2 | 11/2007 |

OTHER PUBLICATIONS http://math.fau.edu/bkhadka/Syllabi/A%20handbook%20of%20applied%20cryptography.pdf "Handbook of Applied Cryptology"—Oct. 2007, Menezes et al.*
http://alumni.cs.ucr.edu/~anirban/Anir%20-%20NCW03.pdf "A Fast Implementation of the RSA Algorithm Using the GNU MP Library"—Biswas et al, Apr. 2007.*

(Continued)

Primary Examiner — Randy Scott
(74) Attorney, Agent, or Firm — Schiff Hardin LLP

(57) ABSTRACT

A data processing system including a memory configured to store confidential data and non-confidential data; a cache memory which is configured to cache data stored in the memory and which comprises a first cache memory region and a second cache memory region; a processing circuit configured to carry out, in a first state of the data processing system, a cryptographic algorithm which operates on the confidential data and on the non-confidential data, wherein the confidential data are cached using the first cache memory region and the non-confidential data are cached using the second cache memory region; and an invalidating circuit configured to invalidate the first cache memory region when the data processing system switches from the first state into a second state.

10 Claims, 3 Drawing Sheets

(56) References Cited

OTHER PUBLICATIONS

Table of Contents of the "Handbook of Applied Cryptography" by Alfred J. Menezes, Paul C. van Oorschot and Scott A. Vanstone. Chapter 14 of handbook "Handbook of Applied Cryptography".

Christopher Giraud; "An RSA Implementation Resistant to Fault Attacks and to Simple Power Analysis"; IEEE Transactions on Computers, vol. 55, No. 9, Sep. 2006, pp. 1116-1120.

D. Page; "Theoretical Use of Cache Memory as a Cryptanalytic Side-Channel"; Technical Report CSTR-02-003, Department of Computer Science, University of Bristol, Jun. 2002.

* cited by examiner

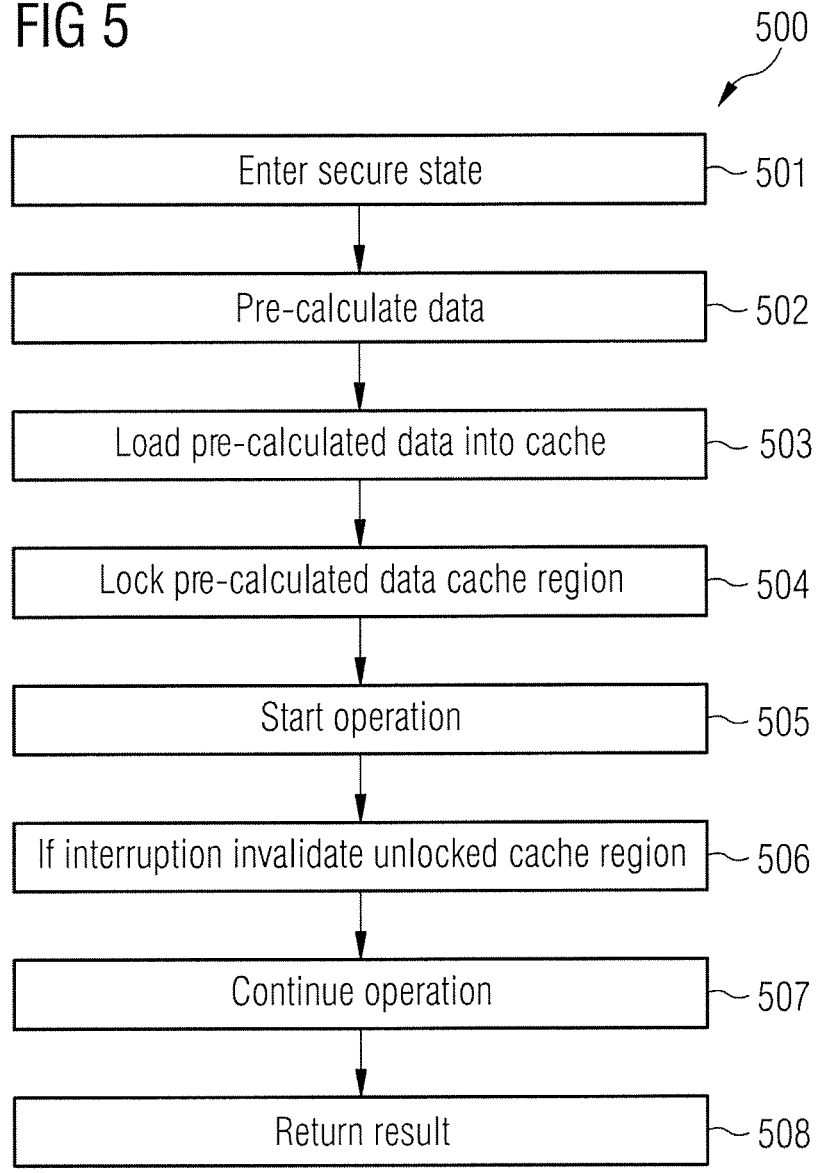

US 8,738,926 B2

DATA PROCESSING SYSTEM, METHOD FOR EXECUTING A CRYPTOGRAPHIC ALGORITHM AND METHOD FOR PREPARING EXECUTION OF A CRYPTOGRAPHIC ALGORITHM

TECHNICAL FIELD

Embodiments relate generally to data processing systems, a method for executing a cryptographic algorithm and a method for preparing execution of a cryptographic algorithm.

BACKGROUND

In electronic computing devices, such as mobile communication devices, cryptographic algorithms are used for ensuring safety of confidential data. Efficient and secure implementations of cryptographic algorithms are desirable, for example with regard to real-time requirements.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 4 shows a state diagram according to an embodiment; and.

FIG. 5 shows a flow diagram according to an embodiment.

DESCRIPTION

Figure 1:
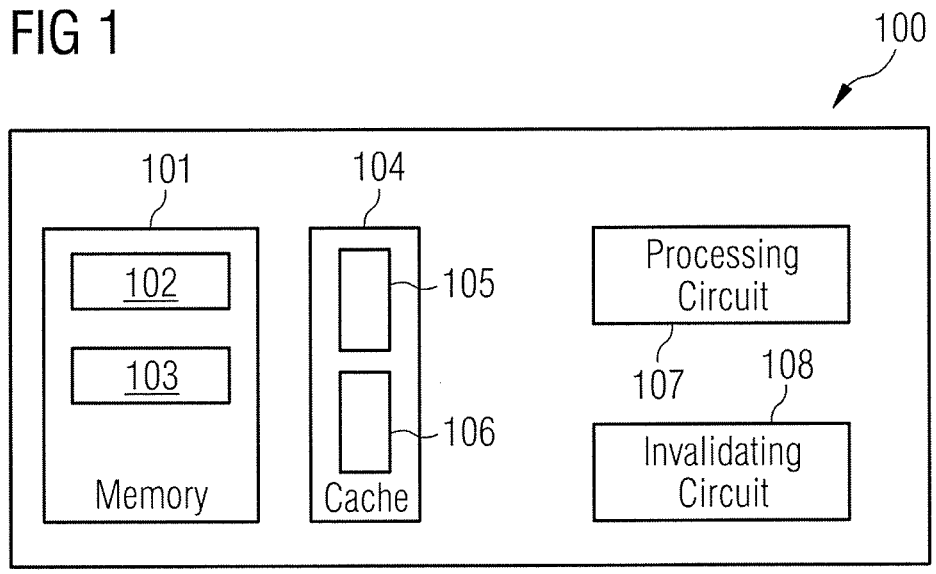
FIG. 1 shows a data processing system according to an embodiment.

Recently, the processing of secret data in data processing systems, for example mobile computing platforms such as mobile communication terminals, has become of increasing importance. Security related features such as secure web browsing, Digital Rights Management (DRM), or PGP (Pretty Good Privacy) for secure email transmission typically include the usage of secret cryptographic keys for symmetric or asymmetric cryptographic methods.

The execution of a cryptographic algorithm by a computing device is typically a critical procedure with regard to security since a cryptographic key used for a cryptographic algorithm may be eavesdropped by an attacker using software or hardware attacks. Since a successful attack would strongly compromise security several software and hardware counter methods have been developed to deter potential attackers. Most cryptographic algorithms used for providing security in data processing are publicly known and thus may be thoroughly analysed by attackers. Accordingly, most attacks try to make use of implementation deficiencies of cryptographic algorithms. When developing a countermeasure against an attack on secure data, the importance of the secrecy of the secret data is usually taken into account when it is decided whatever it is taken for developing and implementing the countermeasure.

In real-time embedded systems such as e.g. mobile phones there are specific demands that are given by the fact that real-time systems have to be able to react to certain events within a defined amount of time (which is sometimes referred to as hard real-time) in order to comply with the requirements on the real-time system. By way of example, a mobile phone using a GSM (Global System for Mobile Communications) mobile communication network should fulfill the requirements defined by the GSM TDMA (Time Devision Multiple Access) frame interrupt.

Mobile communication terminals typically support the execution of downloadable program code. The program code may be in a form such that it is executed by interpreting, as it is for example done according to Java, or it may be in a native form, i.e. in a form such that it may be directly executed by a processor of a mobile communication terminal. The support of the execution of such program code allows the user of a mobile communication terminal to extend the capabilities of the mobile communication terminal according to his preferences. However, it also makes it possible for attackers to bring rogue code onto the mobile communication terminal to break the security protection measures.

In view of the above, there may be two goals when designing secure real-time computing systems, for example mobile communication terminals: The systems should be in a secure state when critical code, e.g. code in which confidential data is processed, is executed and the systems should be capable of responding to real-time critical events, e.g. events to which there has to be a reaction within a certain time period, without compromising confidential data.

There are secure real-time computing systems which are based on dedicated hardware components. For example, these benefit from inherent execution isolation or inbuilt countermeasures to cope with certain hardware attacks. Examples for such dedicated hardware components or security measures based on dedicated hardware components are crypto accelerators, dedicated security controllers, CPU security extensions (such as ARM TrustZone, AMD Pacifica or Intel Vanderpool), and chipcard applications. However, dedicated hardware components increase the total cost of computing system which may not be acceptable in areas with high cost pressure.

For achieving the fastest possible execution time a complex cryptographic algorithm implemented in software should make use of the fastest memory resources of a computing system, for example memory caches or SoC (System on Chip) internal memory without wait-states. In order to allow the system to respond to real-time events quickly it needs to provide a way to quickly wipe out confidential information in each memory region that might hold secret data and that may also be accessed by non-secure functions, e.g. untrusted programs. For example, cache lines which are used during the execution of a cryptographic algorithm and which, depending on their design, may be read out by rogue code by feeding faked page tables to the memory management unit are invalidated when a real-time event has to be processed. However, flushing and invalidating cache lines may take a considerable amount of time (depending on which system memory they are associated with) which may not be acceptable when there has to be a fast reaction to a real-time critical event.

A computing system which for example can be used as a real-time computing system that also provides security for confidential data is described in the following with reference to FIG. 1.

FIG. 1 shows a data processing system 100 according to an embodiment.

The data processing system 100 may include a memory 101 storing confidential data 102 and non-confidential data 103, a cache memory 104 which is configured to cache data stored in memory 101 which includes a first cache memory region 105 and a second cache memory region 106, and processing circuit 107, for example a microprocessor, which is configured to carry out, in a first state of the data processing system 100, a cryptographic algorithm which operates on the confidential data 103 and on the non-confidential data 102, wherein the confidential data 103 are cached using the first memory region 105 and the non-confidential data 102 are cached using the second cache memory region 106.

The data processing system 100 may further include an invalidating circuit 108 which is configured to invalidate the first cache memory region 105 when the data processing system 100 switches from the first state into a second state.

According to one embodiment there is made use of the fact that, depending on the design of the cryptographic algorithm, only a part of a data used in course of the execution of the cryptographic algorithm is confidential whereas other parts are non-confidential and may for example be read out by non-secure system components or programs (i.e. untrusted programs) without causing any harm.

In one embodiment, the cryptographic algorithm is allowed to be executed in the first state and is forbidden to be executed in the second state.

The data processing system may further include an access control circuit granting access to the confidential data stored in the memory in the first state but preventing access to the confidential data stored in the memory in the second state.

The invalidating circuit may be configured to invalidate the first cache memory by overwriting the first cache memory region by second non-confidential data.

According to one embodiment, the data processing system includes a locking circuit configured to lock the second cache memory region such that its cache lines keep their association with memory during the execution of the cryptographic algorithm, i.e. during the execution of the cryptographic algorithm, the part of memory a cache line is used for caching does not change. It should be noted that this means that the content of a cache line of the locked memory region does not change during the execution of the cryptographic algorithm if the part of memory the cache line is used for caching does not change during the execution of the cryptographic algorithm. However, if the part of memory the cache line is used for caching changes during the execution of the cryptographic algorithm the content of the cache line may be changed accordingly. In other words, in one embodiment, the association of the cache lines of the second cache memory region with the parts of memory they are used for caching does not change during the execution of the cryptographic algorithm.

The data processing system may further include a state switching control circuit configured to switch the data processing system from the first state into the second state when there is a request for interruption of the cryptographic algorithm. The request is for example a real-time event.

For example, the confidential data comprises a secret cryptographic key, such as an RSA private key.

In one embodiment, the data processing system is a real-time data processing system. For example, the data processing system is a mobile communication device.

The cryptographic algorithm is for example carried out in response to a request for a cryptographic operation.

In one embodiment, the cryptographic algorithm is the RSA algorithm. In this example, the RSA modulus used for big integer exponentiation is non-confidential and may for example be stored in the second cache memory region 106.

According to one embodiment, the following requirements on a secure RSA implementation in software on a real-time computing system, for example a mobile real-time processing platform such us a mobile phone are taken into account:

Acceptable execution time: The RSA algorithm may be used in applications where quick response times are important. In this case there may be a need for a low execution time of the RSA algorithm. For example, when an RSA protected email is decrypted, users may easily get annoyed when they have to stare for a relatively long time period at a progress indicator showing the remaining processing time. For example, in PGP (Pretty Good Privacy), the RSA algorithm is only used for wrapping a symmetric cryptographic key, but even this action requires a considerable amount of time. The same is true for some e-commerce transactions such as buying operations or installing a rights object such as an OMA (Open Mobile Alliance) DRM (Digital Rights Management) v2 object. For example, an exponentiation with a 1024-bit private exponent may take more than 200 ms on a state-of-the-art microprocessor running at 200 MHz. To achieve this, on-chip cache memories have to be used.

Fast interruptability: Due to the long execution times of the RSA algorithm there may be the need for a possibility to interrupt it. For example, a real-time computing system such as a mobile phone may not be allowed to be limited to the execution of the RSA algorithm for a long time period since it should be able to react to real-time events as fast as required.

Clean-up of hardware resources shared between the secure state and the non-secure state of the data processing system: This requirement is related to the requirement for fast interruptability. In case where the execution of the RSA algorithm has to be interrupted due to the necessity to react to a real-time critical event all confidential data from hardware resources which are shared between the secure state and the non-secure state, i.e. which may be accessed when the data processing system 100 is in secure state and when the data processing system 100 is in non-secure state, are wiped out. Examples for these hardware resources are registers of the processing circuit 107 and the first cache memory region 104 which caches confidential data 103, e.g. the RSA private key exponent. The amount of time needed to write-back and invalidate cache lines typically grows linearly with the amount of cache lines and cache ways present. For allowing a fast switch from secure state to non-secure state this time needs to be kept low.

Constant execution time: The requirement is related to the fact that according to many of the first RSA algorithm implementations the so-called Montgomery ladder is executed bit-wise, i.e. a multiplication is only executed when the current bit to be processed in the private exponent is set to 1. In this case the execution time is correlated with the amount of 1 in the private key exponent which gives attackers the change to derive the private key by measuring execution times. In one embodiment, this effect is reduced by using pre-computed values where several bits are processed in a single step.

Small memory footprint: This requirement applies to both program code for the RSA algorithm and the data used in course of the RSA algorithm. In order to prevent certain attacks such us reading data from external SDRAM (Synchronous Dynamic Random Access Memory), it is most often desired to process security sensitive data, e.g. confidential data, in on-chip memory which is typically scarce in embedded systems, for example in mobile phones.

According to one embodiment, data is pre-calculated to be used in the execution of a cryptographic algorithm. An example for a data processing system where this is done is described in the following with reference to FIG. 2.

Figure 2:
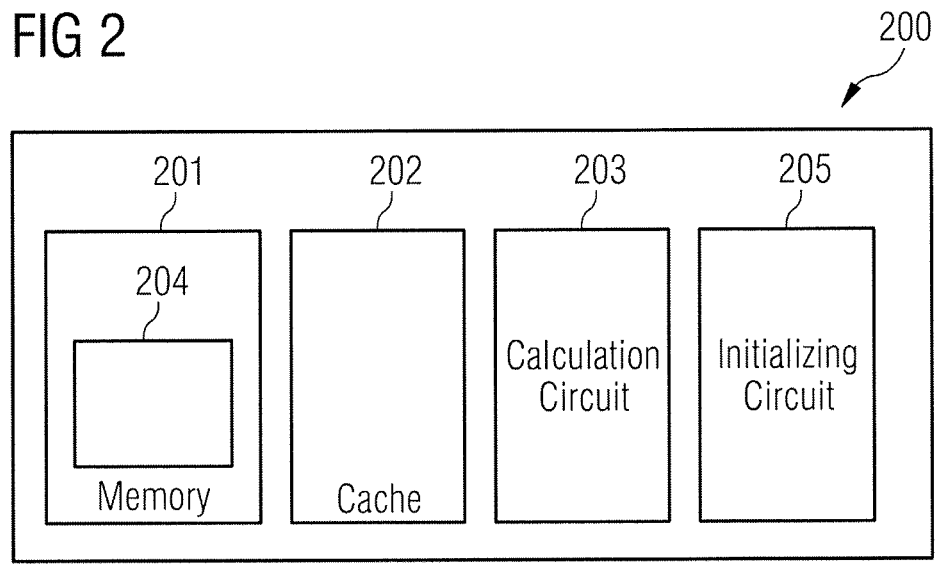
FIG. 2 shows a data processing system according to an embodiment.

FIG. 2 shows a data processing system 200 according to an embodiment.

The data processing system 200 may include a memory 201 storing cryptographic data 204 and a cache memory 202. Further, the data processing system 200 includes a calculation circuit 203 (which is for example implemented by a processor of the data processing system 200) which is configured to pre-calculate data based on the cryptographic data 204 to be used in a cryptographic algorithm wherein the pre-calculated data are data which are to be used in course of the execution of the cryptographic algorithm in an order that is characteristic for a cryptographic key used in the cryptographic algorithm. An initializing circuit 205 scores the pre-calculated data in the cache memory 202.

The pre-calculated data is for example generated from the input to the cryptographic algorithm. For example, the pre-calculated data is generated from non-confidential input to the cryptographic algorithm. In one embodiment, the pre-calculated data is non-confidential.

In one embodiment, the data processing system further includes a locking circuit configured to lock the second cache memory region in which the pre-calculated data is stored such that the association of the cache lines of the second cache memory region with the parts of memory they are used for caching does not change during the execution of the cryptographic algorithm.

The data processing system is for example a real-time data processing system.

The cryptographic algorithm is for example the RSA algorithm but may be any other symmetric or asymmetric cryptographic algorithm.

In one embodiment, the pre-calculated data includes a plurality of data elements and the order in which the data elements are to be used in course of the cryptographic algorithm is characteristic for the cryptographic key. For example, the cryptographic key includes a plurality of symbols, each symbol corresponds to one data element of the pre-calculated data, each symbol of the cryptographic key is processed during the cryptographic algorithm and when a symbol of the cryptographic key is processed, the corresponding data element of the pre-calculated data is to be used. Each symbol is for example a block of one or more bits.

A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit" in accordance with an alternative embodiment.

According to one embodiment, a data processing system is provided that combines the features of the data processing systems described with reference to FIG. 1 and FIG. 2 at least partially. In the following, an embodiment is described which combines the features of the data processing systems 100, 200 shown in FIG. 1 and FIG. 2. The embodiment is applicable to standard system-on-chip solutions where one CPU (Central Processing Unit) executes user applications as well as real-time critical software such as the protocol stack of a mobile communication in network, for example a GSM (Global System for Mobile Communications) or a UMTS (Universal Mobile Telecommunications System) communication network.

Figure 3:
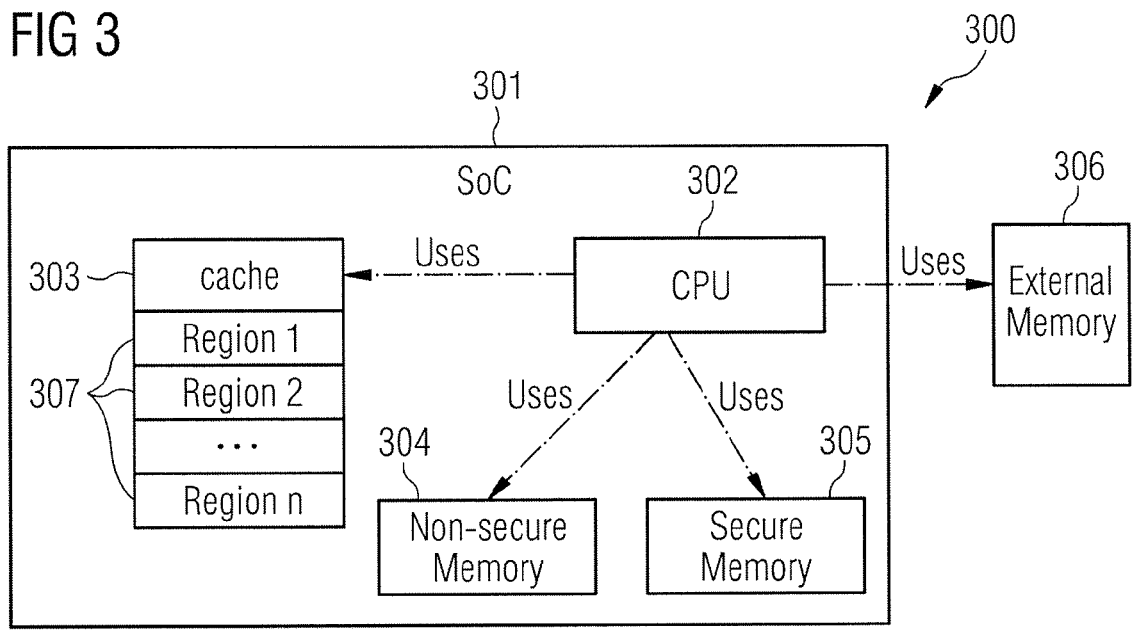
FIG. 3 shows a data processing system according to an embodiment.

FIG. 3 shows a data processing system 300 according to an embodiment.

The data processing system 300 may include a computer chip 301 which implements a system-on-chip (SoC) and includes a central processing unit (CPU) 302, a cache memory 303, a first chip-internal memory 304, and a second chip-internal memory 305.

The CPU 302 may use the chip-internal memories 304, 305 wherein in this example the first chip-internal memory 304 is used as non-secure memory and the second chip-internal memory 305 is used as secure memory, i.e. is used for storing confidential data. The CPU 302 may further use a chip-external memory 306. The second chip-internal memory 305 may not only be used for storing confidential data but also as a work space for carrying out security sensitive operations, for example for executing a cryptographic algorithm. The cache memory 303 includes the plurality of cache memory regions 307 which may be locked down individually by the CPU 302. A locked down cache memory region 307 keeps it contents, i.e. the cache lines that belong to a locked down cache memory region 307 will not be replaced.

It is assumed that the data processing system 300 is based on a hardware architecture where data and instruction cache memory are seperate, e.g. implemented by different cache memory regions 307 of the cache memory 303.

The data processing system 300 is based on a security frame work that allows the differentiation between two states of the data processing system 300. This is illustrated in FIG. 4.

Figure 4:
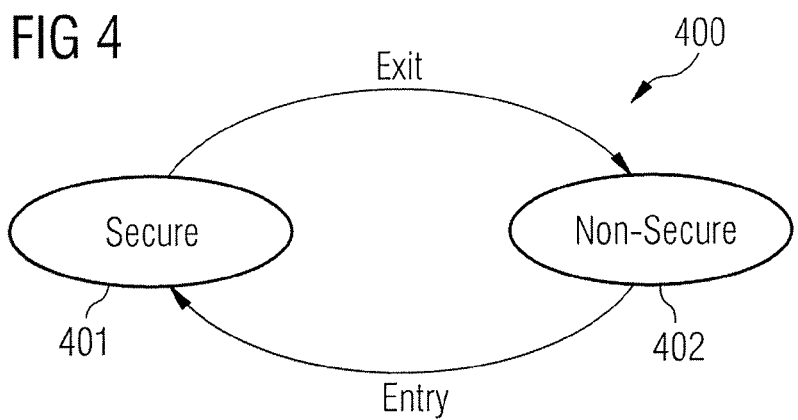

FIG. 4 shows a state diagram 400 according to an embodiment.

The state diagram includes a first state 401 of the data processing system 300 which is denoted as secure state and a second state 402 of the data processing system 300 which is denoted as non-secure state. The data processing system 300 may switch from the secure state 401 to the non-secure state 402, i.e. exit from the secure state 401 and may switch from the non-secure state 402 to the secure state 401, i.e. enter the secure state 401.

The second chip-internal memory 305 may only be accessed when the data processing system 300 is in secure state. The second chip-internal memory 305 is thus a dedicated memory which may be implemented as a memory area of a memory implementing both chip-internal memories 304, 305 or may be a dedicated chip-internal memory component.

In one embodiment, where only an MMU (Memory Management Unit) is available for memory access control, a real-time capable micro-kernel may for example establish a compartment of the chip-internal memory of the chip 301 reserved for RSA operations to which access is restricted as the second chip-internal memory 305. For example, only the micro-kernel runs in a privileged mode and is able to control the MMU.

In another embodiment, where a micro-kernel is not desired, the MMU may remain under the control of a standard real-time operating system and the hardware protection facility protects the data stored in the second chip-internal memory 305 which is for example reserved for RSA operations. In this case, the second chip-internal memory 305 is protected such that it is secure even if a software attacker has full control over the CPU 302. Several mechanisms may be used for preventing the CPU 302 from getting access to the second chip-internal memory 305 when the data processing system 300 is in secure state and for providing the possibility to switch between the secure state 401 and the non-secure state 402. For example, conventional mechanisms may be used.

In one embodiment, the program code of the cryptographic algorithm is stored in the second chip-internal memory 305. Further, as mentioned above, the second chip-internal memory 305 may be used as working memory when the cryptographic algorithm is executed by the CPU 302. The code of the cryptographic algorithm may also be stored in the form of read-only memory (ROM).

A trusted boot mechanism is for example used for ensuring that only authenticated software is loaded and executed in the secure state 401. Further, a mechanism may be provided that makes a private cryptographic key available for usage in the secure state 401. For example, a private cryptographic key is protected by a password only known to the user of the data processing system 300 (as it is the case in PGP-mail). This is not the case for DRM applications where other means of private cryptographic key protection may be used.

The state transition from the secure state 401 to the non-secure state 402 for example occurs when a cryptographic operation that has been requested is completed or when there has to be a reaction to a real-time critical event. The state transition from the non-secure state 402 to the secure state 401 for example occurs when the execution of a cryptographic service or a cryptographic operation is requested, for example the signing of data with a private cryptographic key or when the handling of a real-time critical event due to which an interruption of the cryptographic algorithm has occurred is completed.

In one embodiment, for carrying out the big integer exponentiation for the RSA algorithm the Montgomery multiplication based on pre-calculated values is used. This means that in one embodiment, a term $C=X^d \mod N$, where N is the RSA modulus, d the private key exponent and X is the input is calculated according to:
1. Pre-calculate a set of values which only depend on the input X, namely $X^{t^i}$ with $i=0, \ldots, n-1$ (where n is for example a power of 2 and $n<\log_2(d)$ and X' represents X in Montgomery coordinates). The pre-calculated values are stored to be used during the Montgomery exponentiation. By using the pre-calculated values the number of Montgomery multiplications in the exponentiation loop (see 2.) may be reduced.
2. The key exponent is split into blocks of n bits and for each block the following is carried out:
   a. One Montgomery multiplication with a factor $X^{t^i}$ wherein if $X^{t^i}$ is zero, a dummy multiplication is performed and
   b. n Montgomery square operations.

An example for a flow carried out by the data processing system 300 for carrying out the cryptographic operation is explained in the following with reference to FIG. 5.

FIG. 5 shows a flow diagram 500 according to an embodiment.

In 501, when there is a request for the execution of a cryptographic operation, for example for providing a cryptographic service, the data processing system enters the secure state 401 and flushes, i.e. cleans and invalidates, the cache memory regions 307 that are used in the secure state 401.

In 502, data to be used in course of the cryptographic algorithm that is carried out for performing the cryptographic operation are pre-calculated, i.e. pre-calculated data values are generated, and stored in the first chip-internal memory 304 using contiguous addresses. This means that all pre-calculated data values are stored continuously in a memory area beginning with a first memory address P1 and ending with a second memory address P2. In this example, the cryptographic algorithm is the RSA algorithm and the data values generated each have the size of the RSA modulus. The beginning address P1 is selected such that it is a multiple of the length of the cache lines of the cache memory 303. It is made use of the fact that the values $X^{t^i}$ remain unchanged during the time-consuming exponentiation period. After the generation of the pre-calculated data values, all cache lines are written back and invalidated.

In 503, the pre-calculated data values are loaded into a specific cache memory region 307 of the cache memory 303. For this, all cache memory regions 307 except for the cache memory region 307 into which the pre-calculated data values are to be loaded, which is denoted as pre-calculated data cache region in the following, are locked down. Then the pre-calculated values are loaded into the pre-calculated data cache region by simply reading the pre-calculated data values from the memory, i.e. reading the memory between the first memory address P1 and the second memory address P2, into registers of the CPU 302. When all data stored between the first memory address P1 and the second memory address P2 has been read, the pre-calculated data values are stored in the pre-calculated data cache region.

In 504, the pre-calculated data cache region is locked such that its cache lines are not replaced in the following process. Only one cache memory region 307 of the cache memory 303, which is denoted as confidential data cache region or CONF cache region in the following, stays unlocked and is used for the RSA exponentiation. The CONF cache region is a small cache memory region, e.g. including only one cache way, such that the clean-up (flushing) of this cache region may be carried out fast.

In 505, exponentiation is started. The Montgomery calculation is carried out based on a sequential multiplication and squaring procedure. Intermediate results are updated in the second chip-internal memory 305 and are cached using the unlocked data CONF cache region. When a pre-calculated data value is needed for the multiplication operation, it is fetched directly from the locked pre-calculated data cache region. This means that no cache misses occur when a pre-calculated data value is accessed.

If, in 506, during the exponentiation procedure, a real-time critical event occurs, only the unlocked data cache region CONF is written back to memory and invalidated and the data processing system 300 switches from secure state 401 to non-secure state 402. When switching to the non-secure state 402 the pre-calculated data cache region is left unchanged and is not invalidated because the pre-calculated data values serve only for the acceleration of the execution of the cryptographic algorithm but are not confidential. When switching to non-secure state 402 additional clean-up operations may be carried out. For example, registers of the CPU 302 are cleared. Further, state information may be stored before switching to non-secure state 402. The real-time event is then processed in non-secure state 402.

In 507, after the handling of the real-time event is completed, the data processing system 300 returns to the secure state 401. It is detected, for example based on state information stored, that the cryptographic operation has been interrupted by a real-time event. The entry operations according to 501 are carried out and the pre-calculated data cache region is restored according to 502, 503 and 504. The interrupted processor context, e.g. register contents just before the interruption by the real-time event, is fetched from a stack memory (implemented by a region of the second chip-internal memory 305) in which it was stored before the switching to non-secure state 402 and the CPU 302 continues the cryptographic operation from the point at which it has been interrupted by the real-time event.

In 508, when the cryptographic operation has been completed, the data processing system 300 carries out clean-up operations as in 505, switches to non-secure state 402 and gives the result of the cryptographic operation to the requester, which is for example a program carried out in non-secure state 402.

The embodiment described with reference to FIG. 5 may be seen to be based on an optimized data cache usage (locking, unlocking, write-back and invalidating) used during the private key exponentiation carried out according to the RSA algorithm. The optimized cache usage is achieved by splitting the cache into a "write-once, afterwards read-only" region (in the above example the pre-calculated data cache region) and a "read-write" region (in the above example the confidential data cache region). By doing this, the size of the cache region to be cleaned (flushed) for security reasons when exiting the secure state is minimized since only the read-write region has to be cleaned. Therefore, the cleaning operation may be carried out fast and real-time events can be taken care of quickly. Further, the cache-hit behaviour becomes predictable since the pre-generated data values always give a cache-hit which leads to more or less predictable and constant execution time of the cryptographic algorithm. Thus, the execution time is independent of the distribution and number of bits set to 1 in the RSA private key exponent, which increases the security against a side-channel attack such as measuring execution time, power attacks and so forth. Further, the usage of the cache for the pre-calculated data allows a fast implementation of the cryptographic algorithm.

Simulation on an Armulator modelling an ARM926EJ-S processor with 8 KB D-Cache, 16-KB I-Cache and 64 KB local on-chip memory showed that the variation in execution time could be reduced to less than 10 microseconds for exponents up to 2048 bits although the whole execution of the RSA algorithm takes 1.6 seconds. When the pre-calculated data cache region is not used for storing the pre-calculated data values the variation in execution time goes up to the order of 1 millisecond. The overall variation in execution time may therefore in this case be reduced by 99%.

The embodiment with reference to FIG. 5 does not require special hardware components and is relatively simple to be implemented using software.

The cryptographic operations carried out in secure state 401 may be requested by programs carried out in the non-secure state 402 wherein the input data required for the execution of the cryptographic operation is accessed in the secure state 401. In secure state 401, specific system resources may be used that may only be used in secure state 401, e.g. the second chip-internal memory 305. In one embodiment, the data processing system 300 is a real-time data processing system that has to be able to respond to critical real-time events such as for example air interface events in case of a mobile phone.

As explained above, the cache memory 303 is classified in two parts, the first part for storing non-confidential data which is written once, i.e. initialized and when used as read-only memory (until secure state is exit) and a region for caching confidential data which is not locked but may be accessed using read accesses and write accesses. As explained above, the write-once, afterwards read-only memory region is locked down after initialization, i.e. after the pre-calculated data values have been stored. Unused regions of the cache memory 303 may be locked down for the entire duration of the execution of the cryptographic operation such that the size of the unlocked cache region which is flushed when there is a state transition to non-secure state 402 is kept as small as possible.

Since the only cache region that is used for storing confidential data, namely the read-write region of the cache memory 303 is flushed when the secure state 401 is exit computer programs executed in the non-secure state 402 cannot retrieve confidential information by sniffing cache lines, both after completion of the requested cryptographic operation and during handling of real-time events.

In one embodiment, for computing $C = X^d \mod N$, where X is the data to be processed, d is the private key exponent, N is the RSA modulus having n bits and C is the result of the operation, a binary square- and multiply algorithm is used. This algorithm is given in pseudo code in table 1.

TABLE 1

$S = X$
For i from 1 to n−1 do
    $S = S * S \mod N$
    If $d_i = 1$ then $S = S * M \mod N$
return S In order to accelerate the modulo N reduction, the input X may be transformed into Montgomery coordinates such that the multiplication (line 4 of table 1) becomes a Montgomery multiplication.

For various reasons, an attacker is typically interested in the conditional multiply branch (line 4 of table 1) because it is only executed when the corresponding bit in the private cryptographic key exponent is set to 1. Among others, the effect of this conditional execution is a variation in execution time and traces in the power consumption which may be detected by side-channel attacks. There are counter-measures in order to conceal the relation between the execution path in the corresponding computer program and the distribution of ones in the private key exponent, for example blinding exponent or modulus using a random number or balancing the multiply operations by introducing dummy multiplications etc.

For computation efficiency reasons, some versions of the exponentiation loop may be implemented using a window-based approach, where subsequent bits of the private cryptographic key exponent are grouped to blocks such that the total number of multiplications is reduced significantly. An example for window size of 4 bits (k=4) is given in table 2 in the form of pseudo code.

TABLE 2

$W_0 = 1$
Pre-compute for all $m = 1$ to $2^k$
    $W_m = X * W_{m-1}$

The pre-computed values $W_m$ can be used in the multiply and square loop such that each multiplication is followed by four square operations. The multiplication factor is selected according to the current bit group (block) in the private cryptographic key exponent. For example, when the bit group is 1001 the factor $W_9$ is chosen. As a side effect, the conditional execution is removed (i.e. there is no if condition as in line 4 of table 1). However, the bit group 0000 results in a multiplication with $W_0=1$ which is an operation that may typically be easily observed using side-channel attacks, but even if an attacker is able to detect the 0000 groups in the private cryptographic key exponent by using side-channel attacks, he will on average only be able to derive less than 10% of the total bits of the private cryptographic key exponent which, given a sufficient modulus length, for example 1024, is still acceptable for many applications.

Therefore, in one embodiment, a window-based exponentiation with a group length of 4 is used, because it allows a relatively simple implementation. The price of the window-based exponentiation is increased memory demands, because the pre-computed values $W_m$ are needed during the entire duration of the execution of the cryptographic algorithm. In case of k=4, 15 pre-calculated values, each having the size of the modulus are stored. For n=1024 bits this amounts to 15*1024 which is approximately 1.9 Kbytes.

In one embodiment, also other data is constant during the execution of the cryptographic algorithm, such as the RSA modulus N, are kept in the pre-calculated data region, i.e. the cache region that is initialized at the beginning of the execution of the cryptographic algorithm and when the execution of the cryptographic algorithm is continued after an interruption. In this embodiment, only the dynamic data is cached using the unlocked CONF cache region. When a real-time event occurs that has to be handled not all cache lines in the unlocked cache region CONF need to be flushed and invalidated but only those containing confidential data. In one embodiment, the cryptographic algorithm is implemented in such a way that all parameters of the exponentiation loop are fetched from a stack stored in the second chip-internal memory 305 and, when secure states 401 is exit, only the associated cache lines are written back and invalidated. The size of the cache region to be flushed depends on the modulus length. For example, in case of a 2048 bit modulus about twice as many cache lines have to be flushed compared to the case of a 1024 bit modulus.

A variable used in course of the execution of the cryptographic algorithm may be classified in two ways, namely in terms of confidentiality (confidential/non-confidential) and in terms of access type (read-only/read-write). To minimize the time needed to flush the cache when the secure state 401 is exit, the cache region to be flushed, i.e. the cache region which caches confidential data is minimized by using the CONF cache region for storing all confidential data that needs to be wiped out when the secure state 401 is exit and using other cache regions, including the pre-calculated data cache region for storing non-confidential data that may be accessed in non-secure state 402 without harm.

In one embodiment, for controlling the cache pollution during runtime and making the algorithm execution time predictable all dynamic data is stored in the CONF cache region and static data (write-once, afterwards read-only) is stored in other regions of the cache memory 303. In this way, all cache regions except the CONF cache region may be locked during the execution of the cryptographic algorithm. An example in pseudo-code where the pre-calculated data values are the values $W_i$ is illustrated in table 3.

TABLE 3

1. Init phase: Clean all used data cache regions
2. Pre-compute $W_i$ values; write back and invalidate all used TABLE 3-continued cache lines again
3. Lock CONF cache region. Unlock pre-calculated data cache region. Fetch $W_i$ from memory. Lock pre-calculated data cache region. Unlock CONF cache region.
4. Run square and multiply loop
5. Write back and invalidate CONF cache region. Do all required clean-up procedures and return result to non-secure system
(e.g. program executed in non-secure state)
   In case of a real-time event
      Store context, write back and invalidate CONF cache region,
      do all required
         clean-up procedures and return to non-secure system
      When returning from real-time event
         Run 1., 3.
         Re-establish interrupted context
         Continue where calculation was interrupted While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A data processing system comprising:
a memory configured to store confidential data and non-confidential data;
a cache memory which is configured to cache data stored in the memory and which comprises a first cache memory region and a second cache memory region;
a pre-calculation circuit configured to pre-calculate data based on the cryptographic data to be used in a cryptographic algorithm, wherein the pre-calculated data are data which are to be used in course of the execution of the cryptographic algorithm in an order that is characteristic for a cryptographic key used in the cryptographic algorithm, and wherein the execution time of the cryptographic algorithm is independent of the order of the pre-calculated data;
an initializing circuit configured to store the pre-calculated data in the second cache memory region;
a processing circuit configured to carry out, in a confidential state of the data processing system, a cryptographic algorithm which operates on the confidential data and on the non-confidential data, wherein the confidential data are cached using the first cache memory region and the non-confidential data are cached using the second cache memory region; and
an invalidating circuit configured to invalidate the first cache memory region when the data processing system switches from the confidential state into a non-confidential state.

2. The data processing system according to claim 1, further comprising an access control circuit configured to grant access to the confidential data stored in the memory in the confidential state but prevent access to the confidential data stored in the memory in the non-confidential state.

3. The data processing system according to claim 1, further comprising a locking circuit configured to lock the second cache memory region in which the pre-calculated data is stored such that association of cache lines of the second cache memory region with the parts of memory they are used for caching does not change during the execution of the cryptographic algorithm.

4. The data processing system according to claim 1, further comprising a state switching control circuit configured to switch the data processing system from the confidential state into the non-confidential state when there is a request for interruption of the cryptographic algorithm.

5. The data processing system according to claim 4, wherein the request is a real-time event.

6. The data processing system according to claim 1, wherein the data processing system is a real-time data processing system.

7. The data processing system according to claim 1, wherein the cryptographic algorithm is the RSA algorithm.

8. The data processing system according to claim 1, wherein the pre-calculated data comprises a plurality of data elements and the order in which the data elements are to be used in course of the cryptographic algorithm is characteristic for the cryptographic key.

9. The data processing system according to claim 8, wherein the cryptographic key comprises a plurality of symbols, each symbol corresponds to one data element of the pre-calculated data, each symbol of the cryptographic key is processed during the cryptographic algorithm and when a symbol of the cryptographic key is processed, the corresponding data element of the pre-calculated data is to be used.

10. The data processing system according to claim 9, wherein each symbol is a block of one or more bits.

* * * * *